No. 687,767.  
J. H. MACLAY.  
HOOK AND EYE.  
(Application filed May 2, 1901.)  
(No Model.)

Patented Dec. 3, 1901.

Witnesses  
Geo. Ackman  
B. Frank

Inventor  
Jeannette H. Maclay  
By Victor J. Evans  
Attorney

UNITED STATES PATENT OFFICE.

JEANNETTE H. MACLAY, OF BRATTLEBORO, VERMONT.

HOOK AND EYE.

SPECIFICATION forming part of Letters Patent No. 687,767, dated December 3, 1901.

Application filed May 2, 1901. Serial No. 58,504. (No model.)

*To all whom it may concern:*

Be it known that I, JEANNETTE H. MACLAY, a citizen of the United States, residing at Brattleboro, in the county of Windham and State of Vermont, have invented new and useful Improvements in Hooks and Eyes, of which the following is a specification.

This invention relates to hooks and eyes, being designed especially as a fastening for women's garments.

The main object of the present invention is to do away with the necessity for employing attaching-threads at the bend of the hook in order to keep the hook in position, which threads are soon worn off by the action of the eye and the constant rubbing pressure of the eye against such threads, which results, finally, in releasing the hook adjacent to the bend thereof. By means of the present invention the bend of the hook is held snugly against the material or goods to which the hook is secured, and this is accomplished without the necessity of applying holding-threads around the shank of the hook adjacent to the bend thereof. Incidental to the provision of the shank-holding means I also provide an obstruction or elevation within the hook, which acts to prevent the accidental escape of the eye and the consequent disengagement between the hook and eye.

With the above and other objects in view the invention consists in the novel construction, combination, and arrangement of parts hereinafter fully described, illustrated, and claimed.

Figure 1:
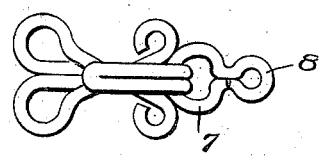
Figure 2:
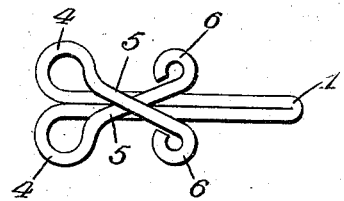
Figure 3:
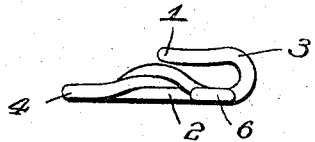
Figure 4:
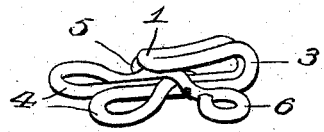

In the accompanying drawings, Figure 1 is a plan view of a hook and eye constructed in accordance with the present invention. Fig. 2 is a plan view of the hook before bending the hook proper. Fig. 3 is a side or edge elevation of the hook. Fig. 4 is a perspective view of the same.

Similar numerals of reference designate corresponding parts in all the figures of the drawings.

The hook and eye contemplated in this invention are each formed in one piece from a single length of wire. In constructing the hook the central portion of the length or blank of wire is folded upon itself, as at 1, to form the bill or point of the hook. Both terminals of the blank are then extended for a certain distance in parallel relation to each other and approximately in contact to form the shank 2, as well as the hook 3, terminating in the point or bill 1. After thus forming the hook and shank the terminals are deflected outwardly in opposite directions and bent in a substantially circular form to provide the thread loops or eyes 4. The terminals are then extended across each other in the form of an X, the said crossing portions 5 of the terminals being also extended across and over the shank 2 of the hook and bent or arched so as to bring the extremities of the crossed portions 5 into the same plane with the shank 2, as clearly illustrated in Fig. 3, the extremities of the terminals being then bent into circular form to constitute the thread loops or eyes 6, which are located in a common plane with each other and with the shank of the hook. In this way all of the thread-loops of the eyes 4 and 6 are arranged in the same plane occupied by the shank of the hook, while the crossed portions 5 form an obstruction within the hook, which projection or hump operates to defeat the accidental escape of the eye. The blank from which the eye is formed is bent at one end into a hook-engaging loop or eye 7, while its opposite end is bent to form a thread loop or eye 8, adapted to receive the threads or stitches whereby the eye member of the device is connected to a garment.

By means of the construction hereinabove described it will be seen that I have done away with the necessity of employing holding-stitches within the bend of the hook, and this result is accomplished by crossing the terminals of the wire over the shank of the hook and locating the thread eyes or loops 6 on opposite sides of but adjacent to the bend of the hook. The crossed portions thus operate to hold the shank snugly against the goods or garment to which the hook is connected, while the remaining thread loops or eyes 4 securely hold the other end of the device against the garment or goods. In this way the chafing action of the eye against the holding-threads which connect the hook to the garment is entirely overcome, while at the same time the hook is held firmly against the material to which it is sewed.

Having thus fully described my invention, what I claim as new, and desire to secure by Letters Patent, is—

In hooks and eyes, the combination with the shank of the hook, of two sets of thread-eyes at each side of the shank, and crossed terminal portions connecting the diagonally opposite eyes and extending across each other and over the shank beneath the bill of the hook.

In testimony whereof I affix my signature in presence of two witnesses.

JEANNETTE H. MACLAY.

Witnesses:
JOHN L. KNOWLTON,
M. M. WHEELER.